United States Patent
Avins

(10) Patent No.: US 9,822,861 B2
(45) Date of Patent: Nov. 21, 2017

(54) TORQUE CONVERTER DRIVE ASSEMBLY INCLUDING SPRING RETAINER RIVETED TO TURBINE SHELL

(71) Applicant: Schaeffler Technologies AG & Co. KG, Herzogenaurach (DE)

(72) Inventor: David Avins, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 26 days.

(21) Appl. No.: 14/687,671

(22) Filed: Apr. 15, 2015

(65) Prior Publication Data

US 2015/0308553 A1    Oct. 29, 2015

Related U.S. Application Data

(60) Provisional application No. 61/983,269, filed on Apr. 23, 2014.

(51) Int. Cl.
| | |
|---|---|
| *F16H 41/28* | (2006.01) |
| *F16H 45/02* | (2006.01) |
| *F16F 15/12* | (2006.01) |
| *F16F 15/14* | (2006.01) |

(52) U.S. Cl.
CPC ............ *F16H 41/28* (2013.01); *F16H 45/02* (2013.01); *F16F 15/1203* (2013.01); *F16F 15/145* (2013.01); *F16H 2045/0205* (2013.01); *F16H 2045/0231* (2013.01); *F16H 2045/0263* (2013.01); *F16H 2045/0278* (2013.01)

(58) Field of Classification Search
CPC ............ F16H 41/28; F16H 2045/0247; F16H 2045/0263
See application file for complete search history.

(56) References Cited

U.S. PATENT DOCUMENTS

| | | | | |
|---|---|---|---|---|
| 5,771,998 | A * | 6/1998 | Olsen ...................... | F16H 45/02 |
| | | | | 192/103 F |
| 7,997,629 | B2 * | 8/2011 | High .................... | A01K 91/047 |
| | | | | 289/17 |
| 2007/0253823 | A1 | 11/2007 | Parks et al. | |
| 2013/0230385 | A1 * | 9/2013 | Lindemann ............. | F16D 33/18 |
| | | | | 415/122.1 |

* cited by examiner

*Primary Examiner* — Jacob S Scott
*Assistant Examiner* — Tinh Dang
(74) *Attorney, Agent, or Firm* — Davidson, Davidson & Kappel, LLC

(57) ABSTRACT

A drive assembly for a torque converter is provided. The drive assembly includes a turbine including a turbine shell and a plurality of turbine blades; and a spring retainer riveted to the turbine shell by at least one rivet. A torque converter for a motor vehicle drive train is also provided that includes the drive assembly and an impeller, with the turbine shell being axially slidable against the impeller to operate as a piston of a lock-up clutch of the torque converter. Further, a method of forming a drive assembly for a torque converter is provided that includes riveting a spring retainer to a turbine shell.

18 Claims, 3 Drawing Sheets

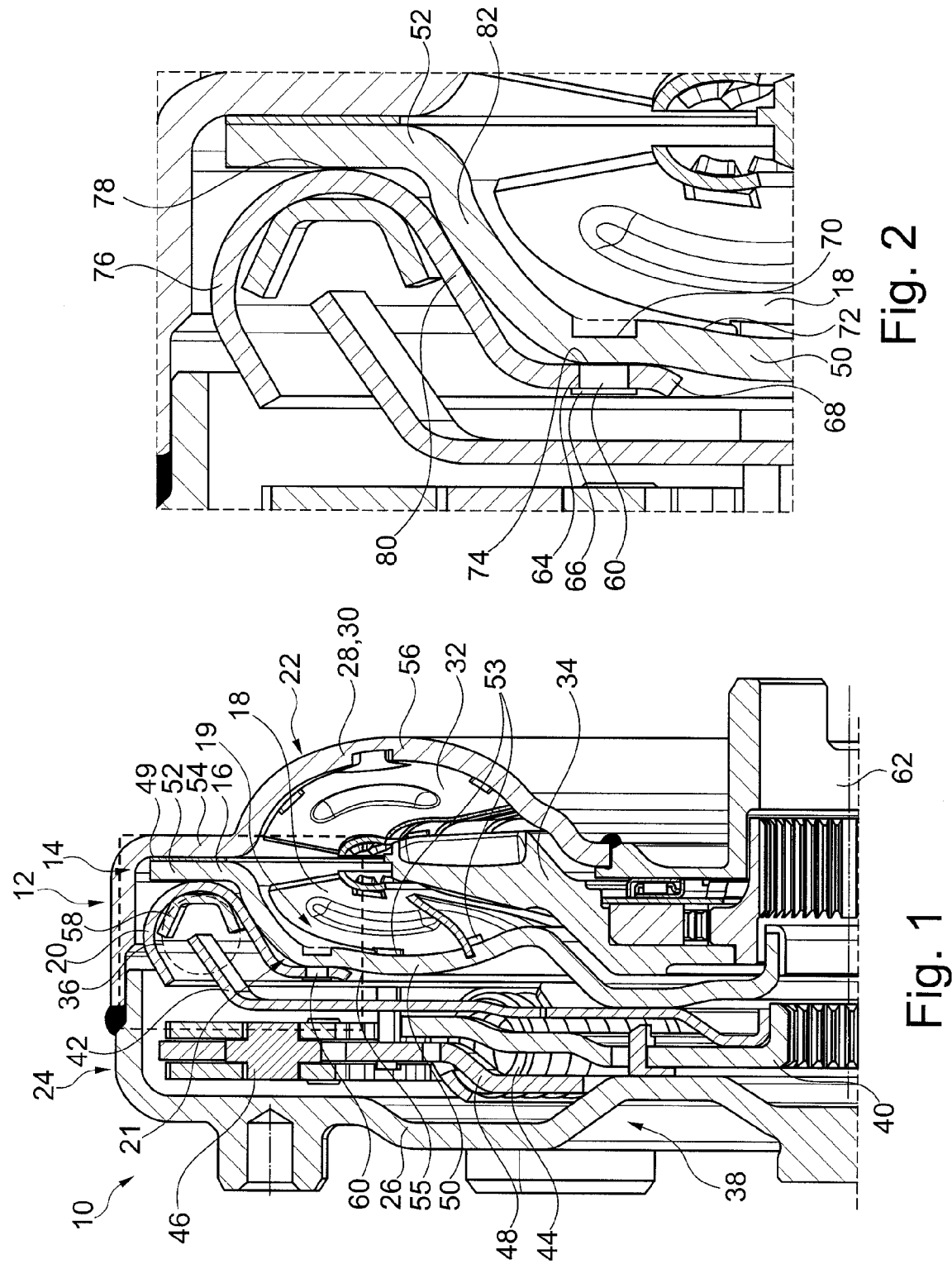

TORQUE CONVERTER DRIVE ASSEMBLY INCLUDING SPRING RETAINER RIVETED TO TURBINE SHELL

This claims the benefit to U.S. Provisional Patent Application No. 61/983,269, filed on Apr. 23, 2014, which is hereby incorporated by reference herein.

The present disclosure relates generally to torque converters for motor vehicle drive trains and more specifically to drive assemblies for torque converters.

BACKGROUND

U.S. Publication No. 2007/0253823 discloses a spring retainer fixed to a turbine shell via turbine blade tabs.

SUMMARY OF THE INVENTION

A drive assembly for a torque converter is provided. The drive assembly includes a turbine including a turbine shell and a plurality of turbine blades; and a spring retainer riveted to the turbine shell by at least one rivet.

A torque converter for a motor vehicle drive train is also provided that includes the drive assembly and an impeller, with the turbine shell being axially slidable against the impeller to operate as a piston of a lock-up clutch of the torque converter.

Further, a method of forming a drive assembly for a torque converter is provided that includes riveting a spring retainer to a turbine shell.

BRIEF DESCRIPTION OF THE DRAWINGS

The present invention is described below by reference to the following drawings, in which:

FIG. 1 shows a cross-sectional side view of a torque converter including a drive assembly in accordance with an embodiment of the present invention;

FIG. 2 shows an enlarged cross-sectional side view of a connection portion of the drive assembly shown in FIG. 1;

DETAILED DESCRIPTION

Figure 3:
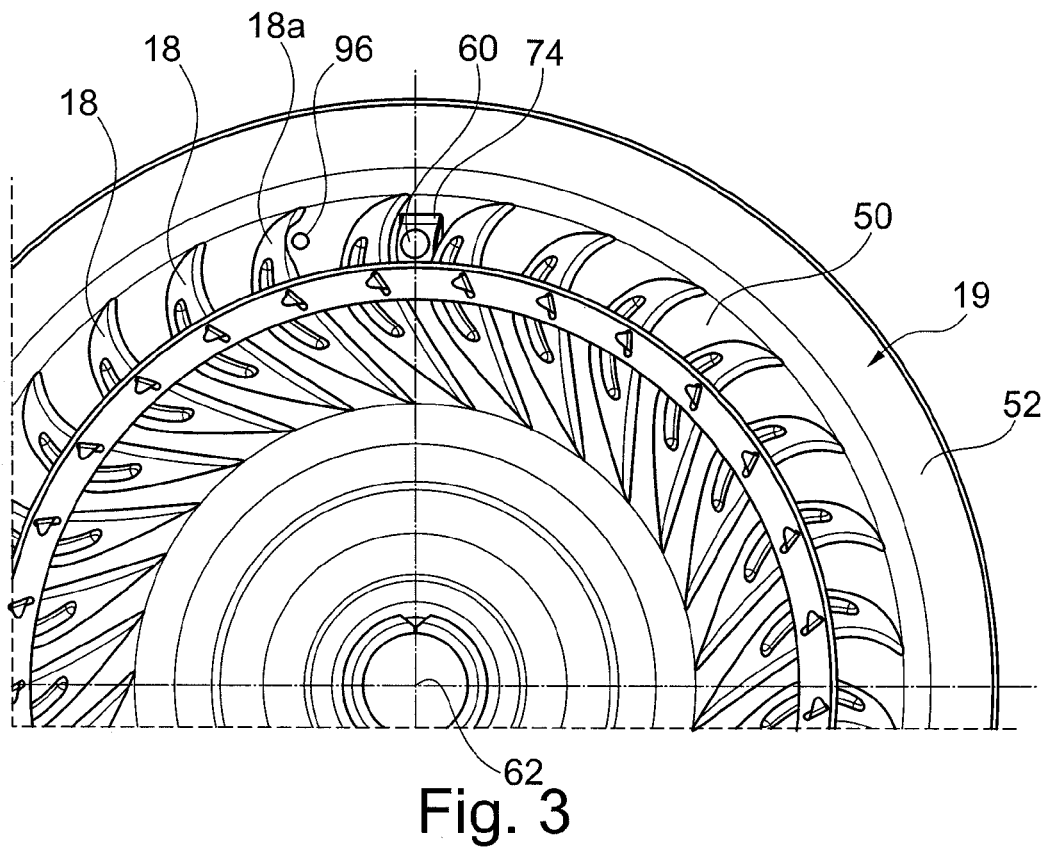
FIG. 3 shows a plan view of a turbine of the drive assembly shown in FIG. 1 as viewed from a blade supporting side of the turbine.

The present disclosure provides a method of fixing a spring retainer to a turbine shell using rivets extruded from the turbine shell and a related drive assembly for a torque converter. This is made possible because an iTC turbine shell, a turbine shell which is axially slidable to operate as piston of a lock-up clutch of a torque converter, is thicker than a conventional turbine shell. The rivets are located on a flat surface formed by small pads formed between adjacent turbine blades. The blade spacing allows enough clearance to insert riveting tooling between the blades. Riveting the components together eliminates welding, and thereby removes a contamination risk and distortion that accompany welding. Conventional, not extruded, rivets may be used in an alternative embodiment.

FIG. 1 shows a cross-sectional side view of a torque converter 10 including a drive assembly 12 in accordance with an embodiment of the present invention. Drive assembly 12 includes a turbine 14, which includes a turbine shell 16 and a plurality of turbine blades 18 fixed on a first axial side 19 of turbine shell 16, and a spring retainer 20 fixed on a second axial side 21 of turbine shell 16 opposite the first side 19. Turbine 14 is axially movable toward and away from an impeller 22 to engage and disengage turbine 14 from impeller 22 and a cover 24 of torque converter 10 so as to operate as a piston of a lock-up clutch of torque converter 10. Cover 24 includes a front cover 26 for connecting to a crankshaft of an internal combustion engine and a rear cover 28 forming a shell 30 of impeller 22. Front cover 26 and rear cover 28 are both substantially cup shaped and are joined by providing an axial extension of front portion 26 radially inside of an axial extension of rear cover 28 and then welding the axial extensions together. Impeller shell 30 supports a plurality of impeller blades 32 on an inner axial surface thereof. Torque converter 10 also includes a stator 34 between turbine 14 and impeller 22.

Spring retainer 20 retains a plurality of circumferentially spaced spring 36, which are schematically shown, that form part of a damper 38 formed between front cover 26 and turbine 14 for transferring torque from turbine 14 to a torque output hub or flange 40, which may be coupled to an input shaft of a variable-speed transmission. Damper 38 further includes a drive plate 42 driven by springs 36, and a plurality of further springs 44 and a centrifugal pendulum absorber 46 driven by drive plate 42. Centrifugal pendulum absorber 46 is positioned radially outside of further springs 44 and includes a flange 48 riveted to drive plate 42.

Turbine shell 16 includes a rounded blade support portion 50 supporting turbine blades 18. Turbine blades 18 may be connected to turbine shell 16 via blade tabs 53 that are inserted in slots 92 (FIG. 5) passing through turbine shell 16 and bent to engage a surface 55 of turbine shell 16 facing away from turbine blades 18. In a preferred embodiment, after blades 18 are connected to turbine shell 16 by tabs 53, blades 18 are brazed to turbine shell 16. The brazing may be accomplished as described in U.S. Pat. No. 7,918,645.

Turbine shell 16 further includes an outer radial extension 52 radially protruding from blade support portion 50. Outer radial extension 52 has a friction surface formed by a frictional material 49 on side 19 of outer radial extension 52 facing toward rear cover 28. Turbine shell 16 selectively engages impeller 22 at a radially extending portion 54 of impeller shell 30, which extends radially from a rounded blade support portion 56 of impeller 22 supporting impeller blades 32, via friction material 49 to transfer torque input into front cover 26 by the engine crankshaft to torque output hub 40 when turbine 14 and impeller 22 have the same rotational velocity. Turbine 14 is axially slidable toward and away from impeller 22 based on specified pressure settings in torque converter 10. Spring retainer 20 is fixed to an outer surface of blade support portion 50 of turbine shell 16 by a plurality of rivets 60 spaced circumferentially from each other about a center axis 62 of torque converter 10. During operation of torque converter 10, spring retainer 20 circumferentially drivingly engages damper 38 via springs 36 by a spring engagement section 58 extending into spaces circumferentially between springs 36. As turbine 14 is driven by impeller 22 about center axis 62, either through contact via friction material 49 on outer radial extension 52 and impeller shell 30 or through fluid flow between blades 18, 32, turbine 14 transfers torque to damper 38 via spring retainer 20.

FIG. 2 shows an enlarged cross-sectional side view of a connection portion of drive assembly 12 of torque converter 10. As shown in FIG. 2, rivets 60 fixing turbine shell 16 and spring retainer 20 together are extruded from blade support portion 50 of turbine shell 16 to form extruded sections 90 (FIG. 5), extruded sections 90 are inserted into holes 64 in spring retainer 20, then extruded sections 90 are stamped to form heads 66. Rivet 60 fixedly connects an inner radial portion 68 of spring retainer 20 to blade support portion 50 of turbine shell 16. As discussed below, a punch may be used to extrude a section of blade support portion 50, leaving an indentation 70 in a surface 72 of turbine shell 16 facing turbine blades 18. The punch may also form flattened mounting pads 74 for spring retainer 20, specifically inner radial portion 68, to mount axially flush against. Mounting pads 74 each surround the corresponding rivet 60. As shown in FIG. 2, punching blade support portion 50 with a punch flattens out a segment of blade support portion 50, causing blade support 50 to extend away in the axial direction from the adjacent blade 18 at mounting pads 74. Accordingly, the contour of blade support portion 50 flattens out at mounting pads 74 to vary from the rounded contour of the remainder of blade support portion 50. In a preferred embodiment, spring retainer 20 and turbine shell 16 are riveted together after turbine blades 18 are brazed to turbine shell 16.

As shown in FIG. 2, the configuration of drive assembly 12 allows spring retainer 20 to be snugly connected to turbine shell 16 to advantageously save space. A rounded radially outer portion 76 of spring retainer 20 supporting springs 36 is radially aligned with outer radial extension 52, and may contact outer radial extension 52 at an outermost axial edge 78 of rounded radially outer portion 76, and an intermediate portion 80 of spring retainer 20, which connects rounded radially outer portion 76 to inner radial portion 68, may contact an outer radial portion 82 of rounded blade support portion 50.

Figure 4:
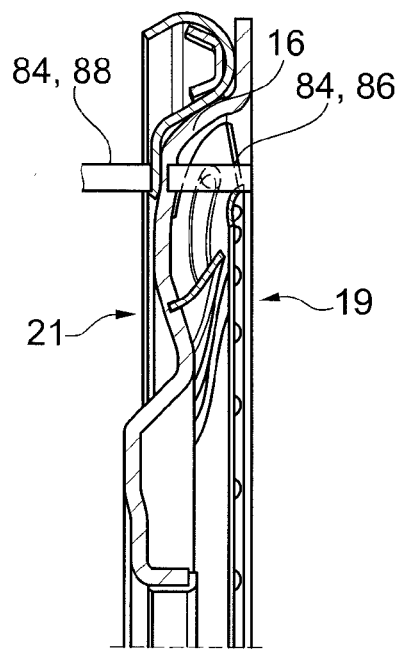
FIG. 4 schematically shows a side cross-sectional view of the drive assembly as a punch is being applied to form extruded rivets for connecting a spring retainer and a turbine shell of the drive assembly and to form mounting pads on the turbine shell.

FIG. 3 shows a plan view of turbine 14 as viewed from the blade supporting side 19 of turbine 14. FIG. 4 schematically shows a side cross-sectional view of drive assembly 12 of torque converter 14 as a punch 84 is being applied to form extruded rivets 60 connecting spring retainer 20 and turbine shell 16 and to form mounting pads 74 on turbine shell 16. As schematically illustrated in FIG. 4, a first section 86 may be used to extrude a section of blade support portion 50, then a second punch section 88 may be used to flatten the end of the extruded section against the surface of spring retainer 20 after the end of the extruded section is passed through hole 64 (FIG. 2) to complete the extruded rivet by forming the rivet head 66. As shown in FIG. 3, punch section 86 may be applied between turbine blades 18 to form rivets 60 and mounting pads 74. More specifically, for each rivet 60, a rivet-shaped protrusion may be formed from turbine shell 16 during stamping, the protrusion may be then inserted into a corresponding hole 64 in spring retainer 20, and the end of the protrusion may be upset or smashed to radially expand the protrusion to fit tightly in the hold and form a mushroom-shaped head 66 on the end. As illustrated with a turbine blade 18a in FIG. 3, cutout sections 96 may be formed in the at least one of turbine blades 18 to provide room for punch section 86 to extrude turbine shell 16.

Figure 5:
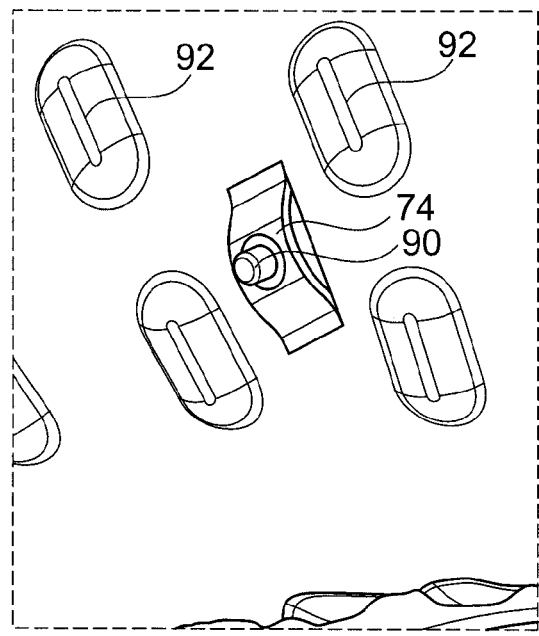
FIG. 5 shows a view of a side of the turbine that connects to the spring retainer, schematically showing an exemplary extruded section that is created by extruding the turbine shell.

FIG. 5 shows a view of side 21 of turbine shell 16 that connects to spring retainer 20, schematically showing an exemplary extruded section 90 (which has not been punched by punch section 88 to form the rivet head 66) that is created by extruding turbine shell 16. In a preferred embodiment, extruded section 90, a rivet-shaped protrusion, is extruded during the formation of turbine shell 16 by stamping. Extruded sections 90 are then inserted into holes 64 in spring retainer 20 and heads 66 are formed by stamping the ends of extruded sections 90 that extend out of holes 64. As schematically shown in FIG. 5, turbine shell 16 is punched between slots 92 formed by embossing turbine shell 16. Tabs 53 (FIG. 1) are passed through slots 92 to connect turbine blades 18 to turbine shell 16.

Figure 6:
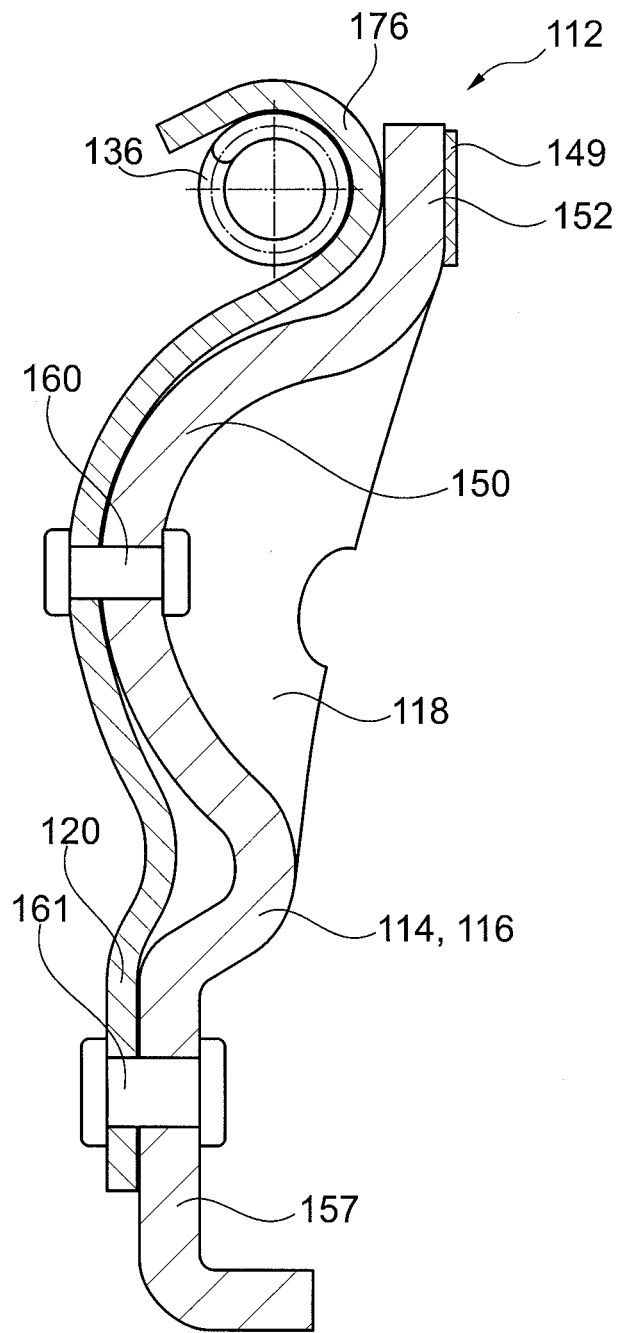
FIG. 6 shows a drive assembly in accordance with an alternative embodiment of the present invention.

FIG. 6 shows a drive assembly 112 in accordance with an alternative embodiment of the present invention that may be used in torque converter 10 in place of drive assembly 12. Drive assembly 112 includes a turbine 114 riveted to a spring retainer 120 at two different radial locations to form a particularly stiff connection between turbine 114 and spring retainer 120. A first set of rivets, radially outer rivets 160, is applied at a rounded blade support portion 150 of a turbine shell 116, which supports turbine blades 118, and a second set of rivets, radially inner rivets 161, is applied at a radially inner extension 157 of turbine shell 116 that extends radially inward from rounded blade support portion 150. As shown in FIG. 6, rivets 160, 161 are conventional, cold headed rivets; however, in other embodiments, these rivets may be formed as extruded rivets. As with drive assembly 12, a rounded radially outer portion 176 of spring retainer 120 supporting springs 136 is radially aligned with an outer radial extension 152 of turbine shell 116. Outer radial extension 152 has a friction surface formed by a frictional material 149 on side 19 of outer radial extension 52 facing toward rear cover 28.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a torque converter comprising:
   a turbine including a turbine shell and a plurality of turbine blades; and
   a spring retainer riveted to the turbine shell by at least one rivet;
   wherein the turbine shell includes at least one flattened mounting pad, each at least one flattened mounting pad surrounding a corresponding one of the at least one rivet.

2. The drive assembly as recited in claim 1 wherein the turbine shell includes an outer radial extension having a friction surface for selectively engaging an impeller shell, the spring retainer including a rounded radially outer portion supporting springs, the rounded radially outer portion being radially aligned with and adjacent to the outer radial extension of the turbine shell such that radially innermost edges of the springs are radially outward of radially outermost edges of the turbine blades.

3. The drive assembly as recited in claim 1 wherein the at least one rivet is at least one extruded rivet.

4. The drive assembly as recited in claim 3 wherein the at least one extruded rivet is extruded from the turbine shell and in a corresponding hole in the spring retainer.

5. The drive assembly as recited in claim 4 wherein the turbine shell includes a blade receiving portion supporting the turbine blades, the at least one extruded rivet being extruded from the blade receiving portion.

6. The drive assembly as recited in claim 1 wherein the turbine shell includes an outer radial extension having a friction surface for selectively engaging an impeller shell.

7. The drive assembly as recited in claim 6 wherein the spring retainer includes a rounded radially outer portion supporting springs, the rounded radially outer portion being radially aligned with the outer radial extension of the turbine shell.

8. The drive assembly as recited in claim 1 wherein the at least one rivet includes a radially outer set of rivets and a radially inner set of rivets.

9. The drive assembly as recited in claim 8 wherein the turbine shell includes a blade support portion supporting the turbine blades and a radially inner extension extending radially inward from the blade support portion, the radially outer set of rivets fixing the spring retainer to the turbine shell at the blade support portion, the radially inner set of rivets fixing the spring retainer to the turbine shell at the radially inner extension.

10. A torque converter for a motor vehicle drive train comprising:
the drive assembly as recited in claim 1; and
an impeller, the turbine shell being axially slidable against the impeller to operate as a piston of a lock-up clutch of the torque converter.

11. The torque converter as recited in claim 10 further comprising a damper connected to the turbine via the spring retainer, the damper including springs retained by the spring retainer.

12. The torque converter as recited in claim 11 further comprising a torque output hub connected to the damper, the torque output hub configured for transferring torque transmitted from the turbine through the damper to an input shaft of a variable-speed transmission.

13. A method of forming a drive assembly for a torque converter comprising:
riveting a spring retainer to a turbine shell, wherein the riveting includes extruding a section of the turbine shell, passing the extruded section through a hole in the spring retainer, and then punching the extruded section to form a rivet head so as to form a rivet,
the extruding of the section of the turbine shell including punching the turbine shell with a punch, the punch flattening the turbine shell surrounding the extruded section to form a mounting pad flushly contacting the spring retainer.

14. The method as recited in claim 13 further comprising fixing a plurality of turbine blades to a blade support portion of the turbine blade shell before the extruding the section of the turbine shell.

15. The method as recited in claim 14 further comprising forming cutout sections in at least one of the turbine blades to provide room for the punch to extrude the section of the turbine shell.

16. The method as recited in claim 13 wherein the riveting includes fixing the turbine shell and the spring retainer together with a radially outer set of rivets and a radially inner set of rivets.

17. The method as recited in claim 16 wherein the turbine shell includes a blade support portion supporting turbine blades and a radially inner extension extending radially inward from the blade support portion, the radially outer set of rivets fixing the spring retainer to the turbine shell at the blade support portion, the radially inner set of rivets fixing the spring retainer to the turbine shell at the radially inner extension.

18. The method as recited in claim 13 wherein the spring retainer is riveted to the turbine shell such that a rounded radially outer portion of the spring retainer for supporting springs contacts a first side of an outer radial extension of the turbine shell, a second side of the outer radial extension opposite the first side including a friction surface for selectively engaging an impeller shell.

* * * * *